Nov. 25, 1952 — R. B. TEMPLE ET AL — 2,619,019

HITCH FOR TRACTOR DRAWN IMPLEMENTS

Filed July 2, 1947 — 3 Sheets-Sheet 1

*INVENTOR*
ROBERT B. TEMPLE
EARL M. SPOHN

BY Maurice A. Crews
*ATTORNEY*

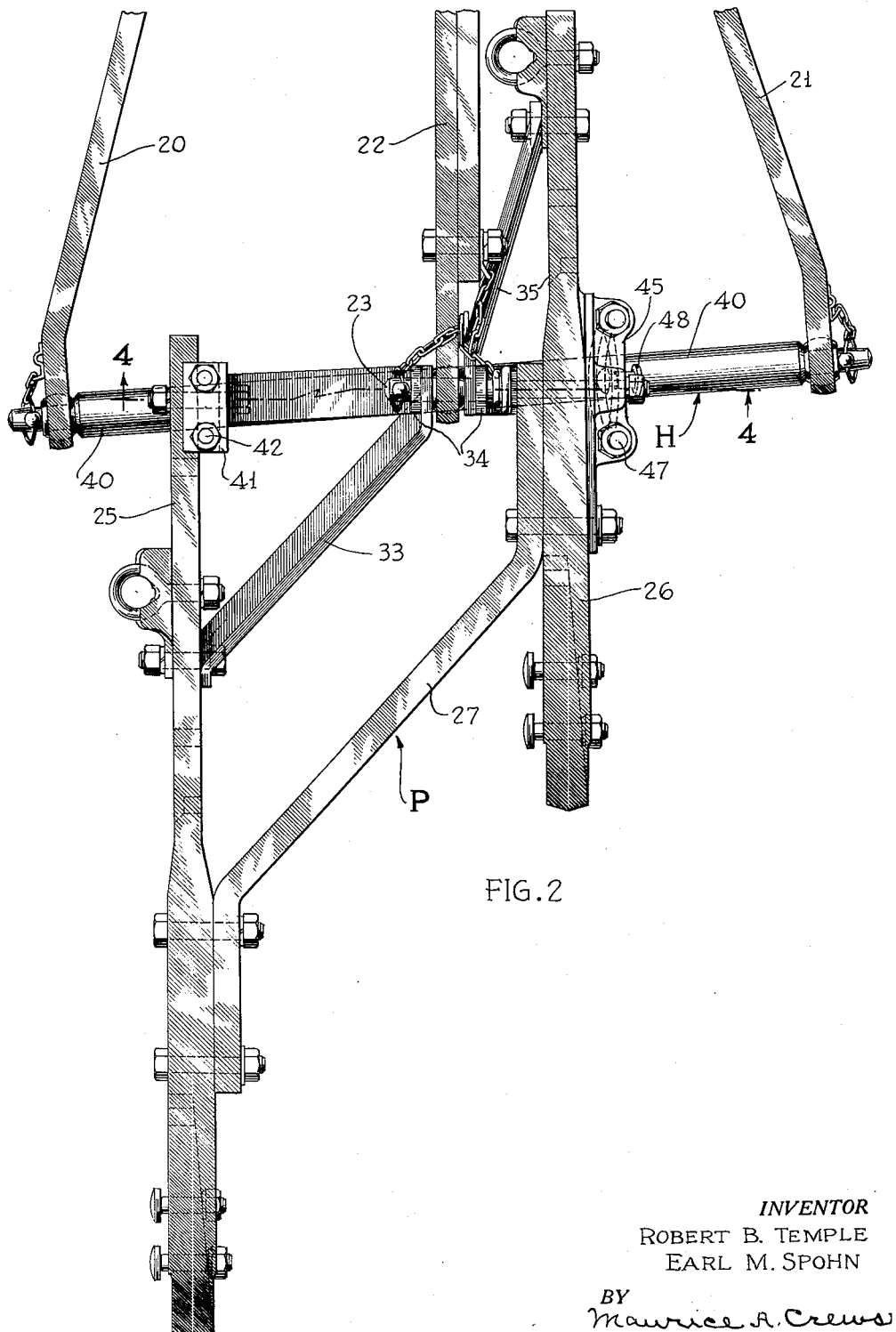

Nov. 25, 1952 — R. B. TEMPLE ET AL — 2,619,019
HITCH FOR TRACTOR DRAWN IMPLEMENTS
Filed July 2, 1947 — 3 Sheets-Sheet 3
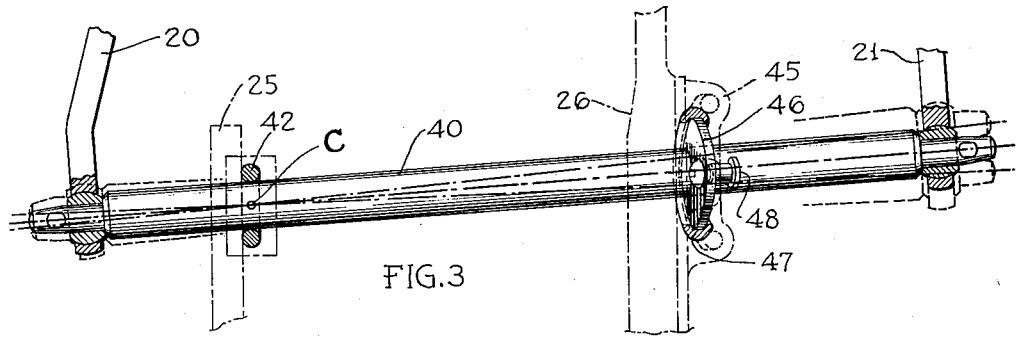
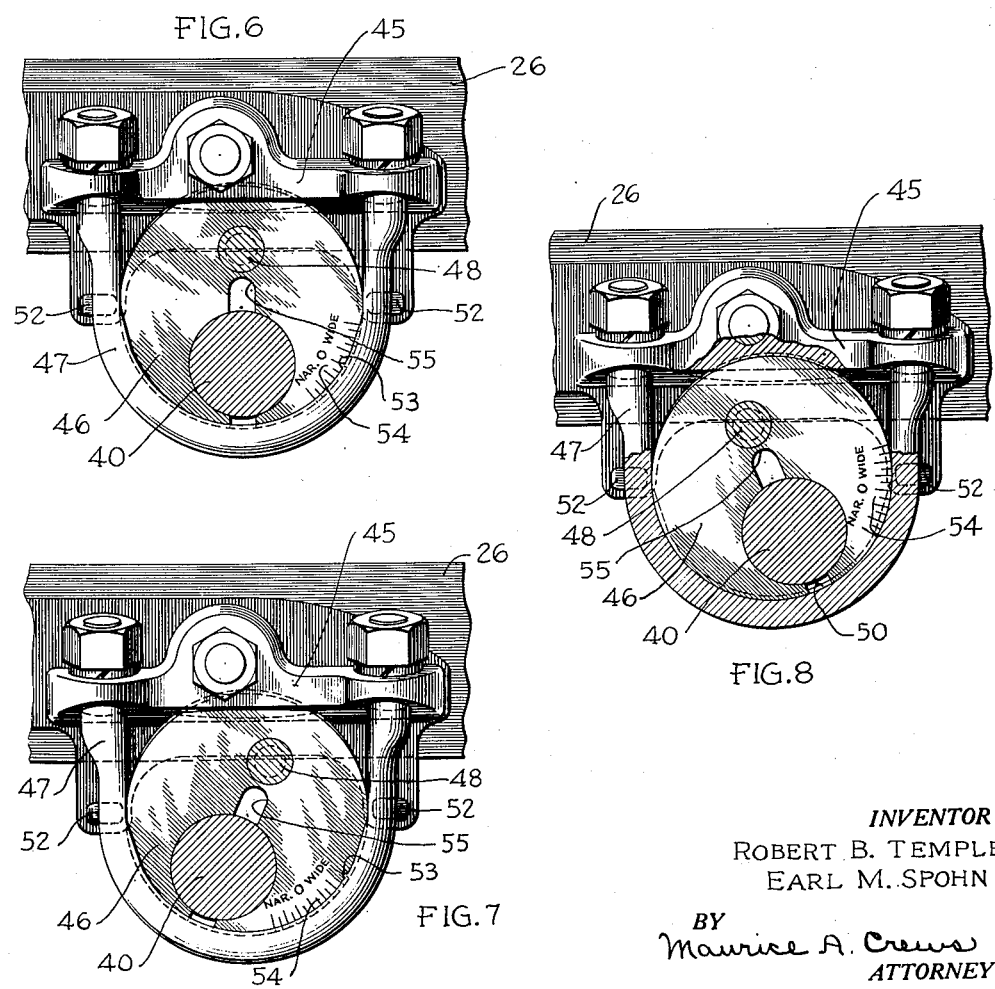
INVENTOR
ROBERT B. TEMPLE
EARL M. SPOHN
BY Maurice A. Crews
ATTORNEY Patented Nov. 25, 1952

2,619,019

UNITED STATES PATENT OFFICE 2,619,019

HITCH FOR TRACTOR DRAWN IMPLEMENTS

Robert B. Temple and Earl M. Spohn, Grosse Pointe, Mich., assignors to The Budd Company, Philadelphia, Pa., a corporation of Pennsylvania Application July 2, 1947, Serial No. 758,676

4 Claims. (Cl. 97—240)

This invention relates to hitches for tractor-drawn implements, such for example as plows, and has for an object the provision of improvements in this art.

For a long time it was usual to draw plows by a hitch having a single pin connection. This worked well for hand guided plows or even for wheel supported plows but did not work well for non-wheeled plows which were drawn behind a tractor without rear manual guidance.

Later there was developed a double hitch link connection, such for example as is exemplified in Patent No. 1,916,945, wherein the action of the hitch is adjusted by a turnable cross-shaft having offset cranks at opposite ends which by rotational adjustment causes the plow to make furrows of different widths. This arrangement is rather expensive and may get out of proper adjustment at times.

According to the present invention a cross bar is employed which is mounted near one end to turn or swing about a vertical axis and which near the other end is provided with means for shifting that end forward and backward largely or wholly in a horizontal plane. In other words, instead of providing a shaft which turns on its own axis, there is provided a cross bar, the whole axis of which swings back and forth generally in a horizontal plane about a vertical axis.

A specific embodiment of the invention is illustrated in the accompanying drawings, wherein:

Figure 2 is a top plan view of the apparatus shown in Fig. 1 but also including part of the hitch links and omitting the plow bottoms and coulters;

Figure 3 is a partial top plan view, partly in section and diagrammatic in nature, to show the adjusted positions of the cross bar;

Figure 6 is a vertical elevation, partly in section, of the adjustable end of the cross bar, the parts being shown in central position;

Figure 7 is a view similar to Fig. 6 but showing the parts in a rearward position; and Figure 8 is a view similar to Fig. 6 but showing the parts in a forward position.

Figure 1:
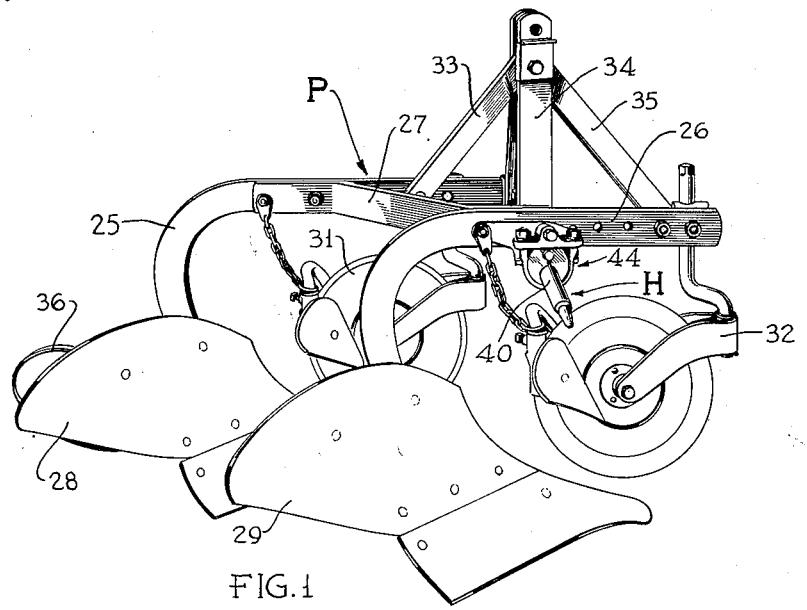
Figure 1 is a side elevation of an implement with hitch connections but with the hitch links omitted.
Figure 4:
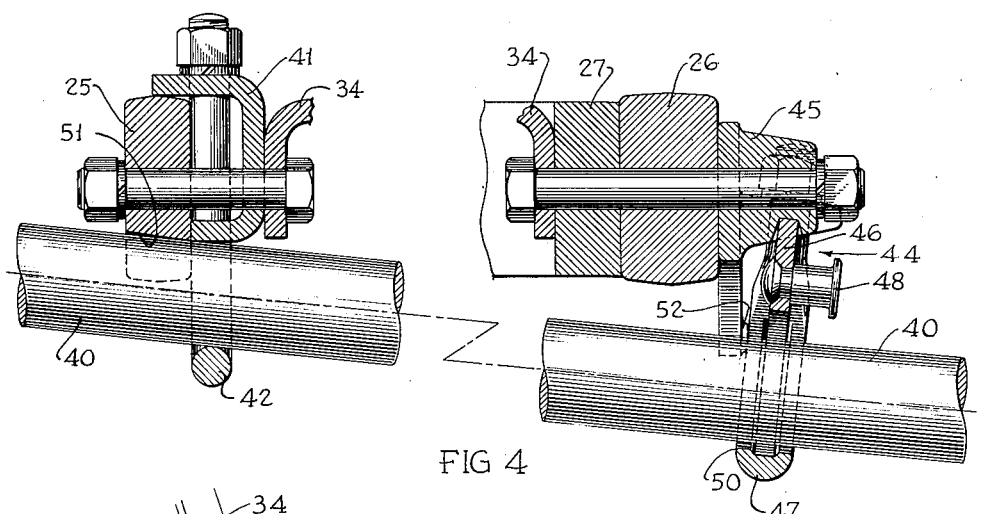
Figure 4 is a vertical section taken on the line 4—4 of Fig. 2.
Figure 5:
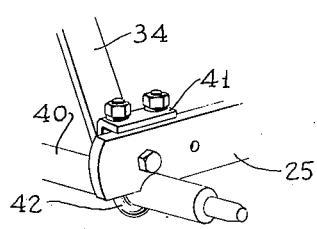
Figure 5 is a partial perspective view of the pivoted end of the cross bar.

As shown in Figs. 1 and 2, an implement such as a plow frame P, is drawn behind a tractor (not shown) by a hitch H which here comprises vertically and horizontally spaced links 20, 21 and 22. The links 20 and 21, paired horizontally, take tension loads during plowing and may be designated as tension links. The upper link 22 takes compression loads during plowing and may be designated as the compression link. Through adjustment of the position of the links with respect to the plow frame, the depth and width of furrow may be adjusted. For a wheeled plow the compression link may not be necessary, the depth of furrow being adjusted relative to the plow wheels; but the horizontal adjustment through the tension links may be similarly made in both wheeled and tractor-borne plows, hence it is not deemed necessary to show the wheeled plow arrangement.

A two-bottom plow is here illustrated as the drawn device, although the hitch is adaptable for other devices, and comprises the laterally spaced beams 25, 26, beam-spacing cross brace 27, plow bottoms 28 and 29, swivelled coulters 31, 32, and upstanding struts 33, 34, 35 to which the compression link 22 is pivotally connected by a pin 23. The rear bottom carries a furrow wheel 36.

The tension links 20, 21 at their rear ends are universally connected to the ends of a cross bar or shaft 40 which is secured across and to each of the beams 25, 26. The cross bar is mounted to swing horizontally, being secured near one end by a bracket 41 and clamp 42 and being provided near the other end with adjustment means 44 for moving it horizontally and there holding it securely in any adjusted position.

The adjusting means may vary in form but that illustrated comprises a bracket 45, an eccentric 46 on the bar, and a U-shaped clamp 47 for holding the eccentric in adjusted positions. A projection 48 on the eccentric provides grip for a suitable turning tool, and this tool may even be so simple as a straight rod which is inserted between the projection 48 and the cross bar 40. Either the eccentric or clamp may be grooved or ribbed to fit the other, as shown at 50, to prevent axial slippage of parts.

The required amount of space or adjustment for accommodating the relative angular or wobble movements of the cross bar may be provided in various ways, as for example, by suitably shaping the hole in the eccentric, by accommodating the movement between the periphery of the eccentric and the surrounding clamp, by providing some shift of the clamp relative to its bracket, or otherwise. At the other end angular clearance space 51 is provided in parts, as the beam 25, adjacent the clamp. The side arms of the clamp 47 engage stop lugs 52 on the bracket 45 to limit side play of the eccentric to prevent binding of the eccentric in the groove.

The mid-position of the eccentric (Fig. 6) is such that the adjustment to each side first largely produces horizontal movement. In Fig. 3 the mid-position is shown in full lines and two adjusted positions in dotted lines. The virtual center C near the beam 25 is also shown.

A pointer, generally indicated at 53 and a cooperating scale 54 are provided to show the position of adjustment. The eccentric 46 is slotted, as at 55, from one edge past the center to provide for releasing the bar 40 when the clamp 47 is loosened and for gripping the bar when the clamp is tightened. The clamp 42 directly and very securely holds the bar 40 in position.

It is thus seen that the invention provides a very simple and inexpensive means for adjusting the hitch for different furrow widths; also that the parts may be easily and quickly adjusted and will securely maintain their position at any place where they are set.

And while one embodiment of the invention has been illustrated and described by way of example, it is to be understood that there may be various embodiments within the limits of the prior art and the scope of the subjoined claims.

What is claimed is:

1. In a hitch for connecting a drawn implement to a tractive implement through two laterally spaced draft links, the combination with one of the implements of a cross bar having spaced connections for said draft links, and mounting means on the implement for the bar at spaced points along its length, said mounting means providing for swinging the axis of the bar on the implement in the general direction of the plane of the links, said mounting means including a disk eccentric turnable about its own axis and carrying the bar eccentrically to the turning axis of the disk, said eccentric being slitted from one side to an opening provided for the shaft, and means for clamping the eccentric and at the same time clamping the shaft in the eccentric.

2. In a hitch for connecting a drawn implement to a tractive implement provided with two laterally spaced draft links, the combination with the drawn implement of a substantially straight cross bar mounted thereon at spaced points along its length and having means at spaced points along its length for connecting it to said links, the mounting means for said bar at one point providing swinging movement of the axis of the bar about said point as a center, and the mounting means for the bar at the other point comprising a circular disk mounted eccentrically on the shaft, an annular seat for said disk providing turning movement about its central axis to give a wabble motion to said cross bar, and means for holding the eccentric securely in various adjusted positions in its annular seat.

3. In a hitch for connecting a drawn implement to a tractive implement through two laterally spaced draft links, the combination with one of the implements of a substantially straight cross bar having spaced connections for said draft links, and mounting means on the implement for the bar at spaced points along its length, said mounting means providing for swinging wabble movement of the axis of the bar on the implement with the major component of movement in the general direction of the plane of the links, said mounting means including a circular disk eccentrically mounted on the cross shaft and being turnable about its own axis and carrying the cross bar laterally of the turning axis of the eccentric relative to the plane of the links, a concentric bearing for said disk, and means for holding the disk in various adjusted positions in its bearing.

4. In a hitch for connecting a drawn implement to a tractive implement through two laterally spaced draft links, the combination with one of the implements of a substantially straight cross bar having means at its ends for connecting it to said draft links, and mounting means on the implement for holding the bar at spaced points along its length, said mounting means including adjusting means for swinging the axis of the bar on the implement in the general direction of the plane of the links while maintaining it substantially against turning around its own axis, and means for holding the bar securely in adjusted positions, said adjusting means including a circular disk eccentrically carried on the cross bar at one mounting point of the bar, said disk when in middle adjusted position carrying the eccentrically disposed shaft axis laterally of the disk axis in a plane normal to the plane of the links and containing the disk axis, a concentric bearing for said disk, and means for holding the disk in various adjusted positions in its bearing.

ROBERT B. TEMPLE.
EARL M. SPOHN.

REFERENCES CITED

The following references are of record in the file of this patent:

UNITED STATES PATENTS

| Number | Name | Date |
|---|---|---|
| Re. 19,762 | Johnson | Nov. 19, 1935 |
| 650,283 | Turney | May 22, 1900 |
| 1,916,945 | Ferguson | July 4, 1933 |
| 2,530,565 | Briscoe | Nov. 21, 1950 |

FOREIGN PATENTS

| Number | Country | Date |
|---|---|---|
| 34,296 | Norway | Mar. 6, 1922 |